United States Patent [19]

Meinert

[11] Patent Number: 4,591,002

[45] Date of Patent: May 27, 1986

[54] PIVOTING SHIELD ASSEMBLY

[75] Inventor: Harry M. Meinert, Urbandale, Iowa

[73] Assignee: Deere & Company, Moline, Ill.

[21] Appl. No.: 642,984

[22] Filed: Aug. 21, 1984

[51] Int. Cl.[4] ............................................. A01B 39/26
[52] U.S. Cl. ..................................... 172/510; 172/456
[58] Field of Search ............... 172/709, 710, 711, 712, 172/713, 311, 456, 305, 81, 112, 776, 508, 509, 510, 511, 512, 513; 47/1.7

[56] References Cited

U.S. PATENT DOCUMENTS

| Re. 9,085 | 2/1880 | Allison | 172/510 |
| 668,770 | 2/1901 | Brook | 172/509 |
| 1,067,638 | 7/1913 | Brumfield | 172/509 |
| 3,426,854 | 2/1969 | Schomaker | 172/509 |
| 4,095,652 | 6/1978 | Vander Lely | 172/47 |
| 4,142,589 | 3/1979 | Schlagenhauf | 172/510 |

Primary Examiner—Richard J. Johnson

[57] ABSTRACT

A shield assembly includes a transverse arm pivotally connected at one end to a bracket assembly fixed to a row crop cultivator rig. A shield tow strap extends rearwardly from the opposite end of the arm. The arm rocks between a horizontal position, wherein the tow strap supports the shield adjacent the row, and vertical position wherein the entire shield assembly extends over the rig completely out of interfering relationship with the row.

16 Claims, 3 Drawing Figures

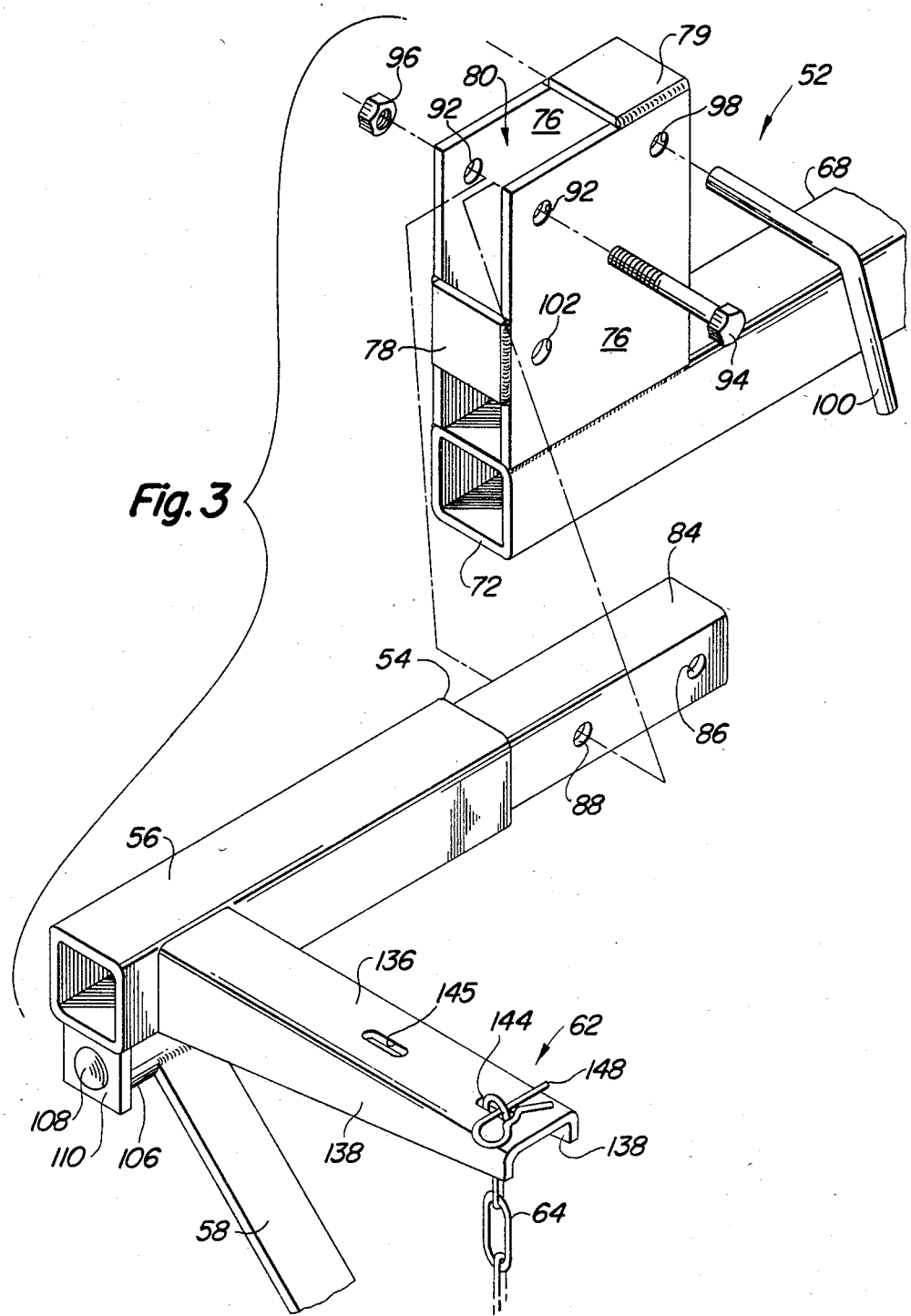

PIVOTING SHIELD ASSEMBLY

BACKGROUND OF THE INVENTION

The present invention relates generally to row crop cultivators and more specifically to a shield or fender assembly used with the cultivator to protect plants by controlling soil flow from the cultivator sweeps.

Cultivator shields are used to protect young plants from injury by dirt or clods thrown by the sweeps during cultivation. Either rotary- or fixed-type shields are typically connected to a fore-and-aft extending linkage or drawbar, and the forward end of the drawbar is pivotally connected to the main transverse toolbar or frame of the implement so the shields can rock vertically. Often, a chain or other stop structure is provided so that the shield can be raised to permit some dirt to flow around the base of the plants.

When taller or more mature plants are cultivated, it may be desirable to completely remove the shields from the row-receiving area of the cultivator. Heretofore, a substantial portion of the shield assembly usually had to be removed from the cultivator so that the row-receiving area could be sufficiently clear to avoid injuring tall plants. Such removal is time-consuming and inconvenient. Alternatively, the pivot point could be moved up by providing a special bracket with a vertically offset pivot point, but such an arrangement is generally bulky and requires a long drawbar. In some instances, where relatively tall plants are being cultivated, the vertically raised pivot point still does not permit the shields to be moved to a location where plant contact and possible injury is entirely eliminated. With most prior art arrangements, there will be some interference in tall crops unless all or a major portion of the shield assembly is physically removed from the implement.

SUMMARY OF THE INVENTION

It is therefore an object of the present invention to provide an improved shield assembly for a cultivator. It is another object of the invention to provide an improved shield assembly which provides better clearance in the row-receiving area of the cultivator when tall crops are being cultivated. It is a further object of the invention to provide such a shield assembly with a significantly reduced drawbar pivot height.

It is yet another object of the invention to provide a shield assembly which can be completely removed from the row-receiving area without disconnecting a substantial portion of the assembly from the cultivator frame. It is a further object to provide such a shield assembly which is connected to the gauged cultivator rig rather than to the main toolbar or transverse frame of the cultivator to provide better shield height control.

In accordance with the above objects, a cultivator shield assembly is connected to a bracket support assembly fixed to the forward portion of a row crop cultivator rig. An arm is pivotally connected at one end for rocking between a vertical storage position, and a horizontal field-working position wherein the distal end is located in the row-receiving area. A shield-supporting drawbar or tow strap extends rearwardly from the distal end so that when the arm is rocked to the horizontal position the shield is in a plant-protecting position in the row-receiving area. However, when the arm is rocked upwardly, the drawbar and shield move to a location above the rig and to one side of the row-receiving area so that tall plants can pass unobstructed through the area, without having to remove the shield assembly from the cultivator. The drawbar is pivotally connected to the arm for rocking about an axis parallel to the arm so that the shield can rock vertically when the arm is in the field-working position. However, when the arm is in the storage position, the axis will be vertical so that the drawbar and shield will be restrained against vertical movement but can be rocked horizontally for storage above the ground-working tools.

The bracket support assembly includes a locking pin arrangement for conveniently securing the arm in either the storage or the field-working position. In the storage position, the shield assembly is completely removed from the row-receiving area to virtually eliminate any shield-related damage to tall plants. In the field-working position, the shield assembly functions to protect plants in generally a conventional matter. However, since the entire shield assembly is supported on the independently depth controlled cultivator rig rather than on the main frame, variations in height of the shields above the ground, when the shields are partially raised to permit some dirt to flow around the plants, are reduced for more predictable coverage. By eliminating relatively high drawbar pivots, the main frame or toolbar is less cluttered and the drawbar lengths are reduced. Also, the horizontal storage position of the shield assembly optimizes the use of available space above the rig and reduces vertical obstructions.

These and other objects, features and advantages of the present invention will become apparent to those skilled in the art from the description which follows and from the drawings.

BRIEF DESCRIPTION OF THE DRAWINGS

FIG. 3 is an exploded view of the bracket and shield support assemblies utilized in the shield assembly of FIG. 1.

DESCRIPTION OF THE PREFERRED EMBODIMENT

Figure 1:
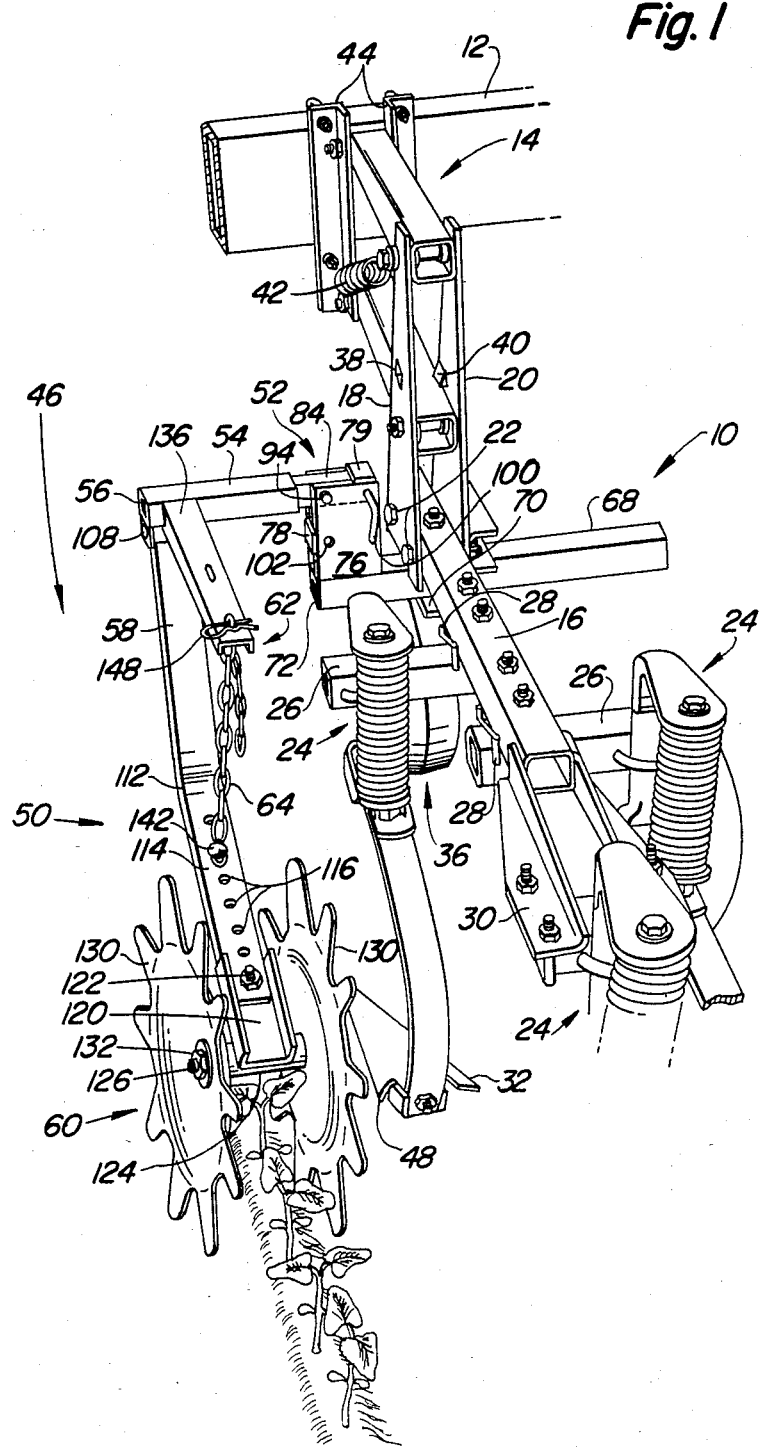
FIG. 1 is a perspective view of a cultivator rig attached to the main frame of a cultivator and showing the shield assembly in the field-working position.

Referring to FIG. 1, therein is shown a cultivator rig 10 connected for rocking with respect to a main transverse toolbar or frame 12 by a conventional parallel bar linkage 14. The cultivator rig 10 includes a main fore-and-aft tool supporting beam or frame 16 secured adjacent its forward end between a pair of upright side plates 18 and 20 of the linkage 14 by bolts 22. A plurality of shank assemblies 24 are supported in transversely and fore-and-aft spaced relationship from the beam 16 in a suitable manner, such as by transverse stub bars 26 and clamping brackets 28 and by a rearwardly extending bracket 30. The lower end of the shank assemblies 24 support conventional earthworking tools 32 such as cultivator sweeps. The shank assemblies 24 are transversely adjustable so that the respective sweeps 32 can be positioned to effectively work the soil between parallel rows of plants without disturbing the roots of the plants.

The forward end of the supporting beam 16 carries a vertically adjustable gauge wheel assembly 36 which supports the beam 16 a preselected distance above the soil so that the depth of penetration of the sweeps 32 remains generally constant. The parallel bar linkage 14 including the upright side plates 18 and 20 maintain the supporting beam 16 approximately parallel to the ground while permitting the rig 10 to rock up and down with respect to the main transverse frame 12. The frame 12 is connected to the rear three-point hitch (not shown) of a towing vehicle such as a tractor and can be raised to remove the entire cultivator rig from the ground. Stops 38 and 40 project inwardly from the inside surface of the plates 18 and 20, respectively, to limit the downward rocking of the rig 10 with respect to the frame 12 so that the rig can be lifted from the ground when the hitch is raised to move the frame 12 to a transport position. When the frame 12 is lowered to a field-working position wherein the gauge wheel 36 contacts the surface of the ground and the shovels 32 penetrate the soil, a spring 42 connected between the upper portion of the side plate 18 and the lower portion of an upright frame mounting bracket 44 provides additional downward biasing of the rig 10.

Figure 2:
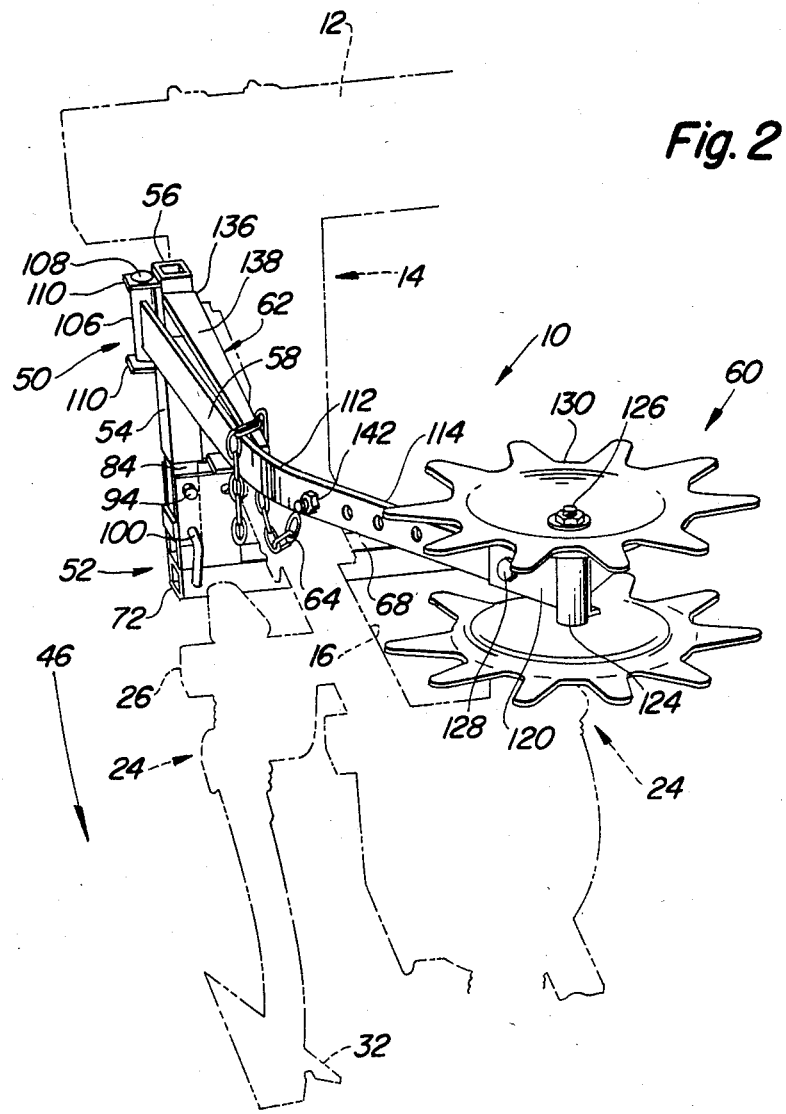
FIG. 2 is a view similar to FIG. 1 but showing the shield assembly in the storage position.

A plurality of the cultivator rigs 10 are transversely spaced along the frame 12 so that adjacent rigs 10 define an open row-receiving area indicated generally at 46 between the outermost sweeps 32. The sweeps 32 adjacent the plant rows are truncated as shown at 48 so that there is no wing or other shovel portion to throw excess dirt towards the plants. However, some dirt and clods will still be thrown inwardly from the sweeps toward the plants, and therefore to avoid injury to delicate plants, a shield assembly 50 is provided. The shield assembly 50 includes a bracket support assembly 52 connected to the forward end of the beam 16 and supporting a transverse arm 54 for rocking about a fore-and-aft extending axis between a horizontal position (FIG. 1) and a vertical position (FIG. 2). The arm 54 includes a distal end 56 which in the horizontal position extends into the row-receiving area 46 above the level of the beam 16, and when in the vertical position extends upwardly adjacent the top portion of the side plate 18 outwardly of the row-receiving area 46. A fore-and-aft extending shield tow strap or drawbar 58 is connected to the distal end 56 for rocking about an axis generally parallel to the axis of the transverse arm 54. The aft end of the drawbar 58 supports a rotating shield assembly 60 alongside the sweeps 32 adjacent the row of plants. A rearwardly extending shield lift chain assembly 62 is connected to the distal end 56 and includes an adjustable tension link member 64 for limiting the rocking of the drawbar 58 with respect to the arm 54. When the arm 54 is in the horizontal or field-working position (FIG. 1) the plant shield 60 protects the plants from dirt and clods thrown by the adjacent shovels 32. When the arm 54 is rocked to the vertical or transport position (FIG. 2), the drawbar 58 is rocked away from the row-receiving area and against the shield lift chain assembly 62 so that the plant shield 60 is totally out of interfering relationship with the row of crops in the row-receiving area 46 and is located generally above the aft end of the beam 16.

The support bracket assembly 52 includes a transverse bar 68 connected below the upright side plates 18 and 20 to the lower side of the supporting beam 16 by a mounting bracket 70 or other conventional connecting means. The beam 68 is located forwardly of the forwardmost stub bar 26 and includes an end portion 72 which is generally coextensive with, or slightly offset to the right as viewed in FIGS. 1 and 2 with respect to, the correspondingly adjacent stub bar 26.

A pair of generally identical plates 76 are welded to the top of the beam 68 and extend vertically from the forward and aft faces of the end portion 72 of the beam. A reinforcing member 78 is welded between the lower, left-hand (FIG. 3) edges of the plate 76. A second reinforcing member 79 is welded between the upper, right-hand edges of the plate 76. The plate 76 and members 78 and 79 define an arm-receiving area indicated generally at 80 in FIG. 3 which opens both upwardly and toward the side in the direction of the row of plants.

The arm 54 has a reduced sized end 84, opposite the distal end 56, with opposed fore-and-aft faces which lie closely adjacent the plates 76. The faces of the end 84 are apertured at 86 and 88. The apertures 88 are aligned with apertures 92 in the upright plates 76, and a pivot pin 94 is inserted through the apertures to hingedly connect the arm 54 for rocking between the plates 76. The pivot pin 94 has a threaded end which receives a nut 96 to retain the pin in position. When the arm 54 is rocked upwardly about the pin 94, the bottom surface of the end 84 contacts the member 78 to prevent further rocking of the arm beyond a vertical position. The member 79 contacts the top portion of the end 84 when the arm 54 is rocked downwardly to assure the arm does not rock beyond a horizontally extended position. With the arm in the horizontal or field-working position (FIGS. 1 and 3) the endmost aperture 86 of the bar 54 aligns with apertures 98 in the plates 76, and a retaining pin 100 may be inserted through the apertures 86 and 98 to lock the arm in position. In order to change from the horizontal position to an upright storage position, one simply removes the pin 100 from the apertures 86 and 98, and swings the arm 54 upwardly to a vertical position so the holes 86 in the end 84 align with a pair of apertures 102 in the plate 76. The pin 100 is then inserted through the apertures 102 and 86 to secure the arm 56 in the transport position (FIG. 2).

The drawbar 58 includes a forward eye-end 106 which is pivotally connected to the distal end 56 of the arm 54 by a pivot pin 108 which is inserted through apertures in a pair of spaced ears 110 welded to the bottom face of the beam 54. The axis of the pivot pin 108 is parallel to the axis of the arm 54. The drawbar 58 extends rearwardly to a bend location 112 and terminates in an apertured aft end 114 including a plurality of fore-and-aft spaced holes 116. The plant shield assembly 60 includes an upwardly opening channel-shaped bracket 120 embracing the end 114 of the drawbar 58, and a bolt 122 is inserted through the bracket 120 and a selected one of the holes 116 to position the shield assembly 60 in the desired location with respect to the shovels 32 (FIG. 1) over the plant row. The underside of the bracket 120 mounts a transversely extending bearing member 124 which journals an axle 126 for rotation about an axis generally parallel to the axis of the pivot pin 108. A pair of outwardly concave dish-shaped rotary plant shields 130 are mounted on the opposite ends of the axle 126 by nuts 132. The rotary shields 130 are transversely spaced (FIG. 1) a sufficient distance apart to allow small plants to pass therebetween undamaged. The bolt 122 may be inserted into a different one of the holes 116 to change the location of the bracket 120 and adjust the fore-and-aft position of the shields 130 for optimum shielding performance.

To lift the drawbar 58 with the shields 130 from the ground as the frame 12 is lifted to the transport position, and to adjust the vertical position of the shields 130 with respect to the cultivator rig 10 to permit some dirt to flow around the plants when desired, the shield lift chain assembly 62 is provided. The assembly 62 includes a downwardly opening, channel-shaped shield hanger 136 welded at its forward end to the distal end 56 of the arm 54. The hanger 136 extends generally horizontally and includes sidewalls 138 having lower edges which angle towards the top surface of the hanger in the rearward direction (FIG. 3). The chain 64 (FIG. 1) is connected at one of its ends by a bolt 142 to one of the forward apertures 116 in the drawbar 58. A selected one of the links of the chain 64 adjacent the opposite end is inserted through one of a pair of fore-and-aft spaced apertures 144, 145 located in the shield hanger 136, and a pin 148 is inserted through the link to retain the chain in the hanger. In small crops, the chain is generally lengthened sufficiently between the drawbar 58 and the shield hanger 136 to permit the shields 130 to provide maximum protection for the plants. However, during cultivation of more mature plants, the length can be decreased so that the shields 130 ride higher with respect to the shovels 32 to permit some soil to flow around the base of the plants. Since the shield assembly 50 is mounted on the rig beam 16, the relationship of the shields 130 with respect to the sweeps 32 and with respect to the row of plants will remain more consistent than, for example, if the assembly were directly pivoted from the main frame 12.

In operation, when the operator desires to protect the plants with the shields 130, the arm 54 is pivoted to the horizontal position (FIG. 1), and the pin 100 is inserted through the apertures 86 and 98 to lock the arm in position. The shields 130 roll over the ground on either side of the plants about a transverse axis defined by the axle 126. The drawbar 58 can rock up and down in a generally vertical plane about the pin 108 to permit the shields to follow contours in the ground and to rock up over obstacles. When tall crops, such as relatively mature corn, are to be cultivated, the operator may completely remove the shield assembly 50 from the row-receiving area simply by removing the pin 100 and rotating the arm 54 upwardly about the pin 94 through an angle of approximately ninety degrees to the vertical position (FIG. 2). The pin 100 is then inserted through the apertures 88 and 102 to lock the assembly in the storage position. Since the pivot pin 108 is now in a vertical position, the drawbar 58 can no longer move a substantial distance vertically but is restrained for movement only in a generally horizontal plane. The drawbar 58 is pivoted against the lower edges of the sidewalls 138 of the shield hanger 136. The chain 64 may be utilized to secure the drawbar 58 against the shield hanger 136 to prevent the shield assembly 60 from swinging out into the row-receiving area 46. As best seen in FIG. 2, the bend location 112 is located adjacent the aft end of the hanger 136 and the aft end 114 of the drawbar 58 is angled toward the right as viewed in FIG. 2 so that the plant shield assembly 60 is located over the cultivator rig 10 in such a manner as to be completely out of interfering relationship with the plants which pass through the row-receiving area 46 as the implement is towed forwardly through the field. The length of the arm 54 from the pivot pin 94 to the drawbar pivot pin 108 is sufficiently long to assure that the entire plant shield assembly 60 clears the uppermost extremities of the shank assemblies 24. In the storage position, the top of the arm 54 lies closely adjacent the plate 18 of the parallel bar linkage 14, and the forward end of the drawbar 58 as seen in FIG. 2 is out of the row-receiving area 46.

Having described the preferred embodiment, it will be apparent that modifications can be made without departing from the scope of the invention as defined in the accompanying claims.

I claim:

1. In a cultivator having a frame adapted for forward movement over a field having rows of crops, earthworking tools transversely spaced on the frame and defining a crop row-receiving area, said tools for engaging the soil beside the row-receiving area, a shield assembly comprising:

a transverse arm having a first end and a distal end;

means hingedly supporting the first end of the arm on the frame for rocking between a first position wherein the distal end of the arm is located above the row-receiving area and a second position wherein said distal end is located above the earthworking tools and offset towards one side of the row-receiving area, said means hingedly supporting including a bracket fixed to the frame, and a pivot pin offset from the frame and connected to the bracket and to the first end of the arm for permitting the arm to rock with respect to the bracket about the axis of the pivot pin;

a shield including at least one plant-protecting surface;

means connecting the shield to the arm in trailing relation to said distal end of the arm for maintaining the surface in an upright attitude in the row-receiving area adjacent the tools when the arm is in the first position, and in a generally horizontal position above and offset towards said one side of the area when the arm is in the second position, said means connecting including pivot means for permitting the shield to rock vertically about a generally horizontal axis when the arm is in the first position and restraining the arm from substantial vertical rocking when the arm is in the second position.

2. In a cultivator having a frame adapted for forward movement over a field having parallel rows of crops, a cultivator rig attached to and vertically rockable with respect to the frame, said rig including a tool-support beam, and earthworking tools located on the beam for engaging the soil beside a row of crops, a shield assembly comprising:

a fore-and-aft extending drawbar;

a shield connected to the aft end of the drawbar;

means for supporting the drawbar in a first position alongside of the corresponding row of crops with the shield located between one of the spaced tools and the row, said means including an arm connected to the forward end of the drawbar and extending transversely therefrom to an offset end;

means pivotally connecting the offset end to the tool-support beam for permitting the drawbar to rock upwardly from the first position about a fore-and-aft extending axis located above the tools transversely outwardly of the row, said drawbar rockable upwardly toward a second position wherein the drawbar and shield are located above the axis and transversely offset from, and out of interfering relationship with, the row of crops; and wherein the means for supporting the drawbar includes a bracket with a plurality of apertures connected to and extending upwardly from the beam and pin means associated with the arm and selectively insertable into a one of the apertures for maintaining the arm in either of the first or second positons.

3. The invention as set forth in claim 2 wherein the bracket includes a pivot defining the axis, and the apertures are located on an arc centered on the axis, and said arm portion includes a hole rockable into alignment with the apertures as the arm is rocked between positions.

4. The invention as set forth in claim 2 wherein the forward end of the drawbar is pivotally connected to the end of the arm opposite the offset end for rocking in a vertical plane when in the first positon.

5. The invention as set forth in claim 2 wherein the fore-and-aft extending axis is horizontal and the arm extends horizontally from the pivot when the drawbar is in the first position, and vertically from the pivot when the arm is in the second position.

6. In a cultivator rig having a fore-and-aft extending tool-carrying beam adapted for forward movement over a field having rows of crops, earthworking tools supported on the beam and defining a crop row-receiving area, said tools for engaging the soil beside the row-receiving area, a shield assembly comprising:
   a drawbar having forward and aft ends;
   a crop shield connected to the aft end of the drawbar;
   a bracket connected to the tool-carrying beam and extending generally transversely to the beam;
   an arm having first and second ends, said first end pivotally connected to the bracket for rocking about a fore-and-aft extending axis offset above and outwardly of the row-receiving area and outwardly of the beam, said arm rockable between a field-working position, wherein the second end extends outwardly from the axis to a position above the row-receiving area, and a transport position offset transversely from the row-receiving area and offset to one side of the beam; and
   means connecting the forward end of the drawbar to the second end of the arm with the crop shield in trailing relation to the second arm, said crop shield supported in the row-receiving area when the arm is in the field-working position and outwardly of the area and above the tools when the arm is in the transport position, wherein the means connecting comprises a pivot connection rockable with the arm between a horizontal transverse attitude above the row-receiving area when the arm is in the field-working position for permitting the shield to rock in an upright plane, and an upright attitude offset to one side of the area when the arm is in the transport position for preventing substantial rocking of the shield in an upright plane.

7. The invention as set forth in claim 6 wherein the shield comprises a rolling shield journalled for rotation about an axis generally parallel to the axis of the pivot connection.

8. The invention as set forth in claim 7 wherein the second arm is rockable through an angle of about ninety degrees.

9. In a cultivator having a frame adapted for forward movement over a field having rows of crops, earthworking tools transversely spaced on the frame defining a crop row-receiving area, said tools for engaging the soil beside the row-receiving area, a shield assembly comprising:
   an upright bracket connected to the frame;
   an elongated arm connected at one end to the bracket for rocking about a fore-and-aft extending axis between a horizontal field-working position wherein the distal end of the arm extends directly above the crop-receiving area and an upright transport position wherein the distal end is offset to one side of the area;
   a fore-and-aft extending drawbar;
   means pivotally connecting the fore end of the drawbar to the distal end of the arm for rocking about an axis generally parallel to the axis of the arm, whereby when the arm is in the horizontal field-working position the drawbar is rockable in an upright plane in the area and when the arm is in the upright transport position the drawbar is offset from the area and restrained from substantial vertical rocking; and
   a crop shield supported at the aft end of the drawbar.

10. The invention as set forth in claim 11 wherein the bracket includes a first aperture offset from the fore-and-aft extending axis and the arm includes a mating aperture which aligns with the first aperture when the arm is in the transport position, and pin means insertable through the apertures to selectively lock the arm in the transport position.

11. The invention as set forth in claim 10 including a further aperture, said pin means insertable through said further aperture when the arm is in the field-working position to lock the arm in the field-working position.

12. The invention as set forth in claim 9 wherein said arm is rockable through an angle of approximately ninety degrees.

13. The invention as set forth in claim 9 further including a fore-and-aft extending shield hanger fixed to said other end of the arm located above the drawbar when the arm is in the horizontal field-working position.

14. The invention as set forth in claim 13 including means for supporting the drawbar against the shield hanger, when the arm is in the transport position, with the aft end of the drawbar extending over the tools and out of the crop-receiving area.

15. The invention as set forth in claim 13 including depth-gauging means connected to the frame for moving the frame vertically, tension link means connected between the shield hanger and the drawbar for adjusting the height of the shield with respect to the tools, and wherein said shield support is movable vertically with the frame for maintaining a generally constant vertical relationship between the crop shield and the tools when the arm is in the field-working position.

16. The invention as set forth in claim 16 wherein the aft end of the drawbar is bent off-axis and extends away from the row-receiving area adjacent the shield hanger.

* * * * *

UNITED STATES PATENT AND TRADEMARK OFFICE
CERTIFICATE OF CORRECTION

PATENT NO. : 4,591,002

DATED : 27 May 1986

INVENTOR(S) : Harry Mathais Meinert

It is certified that error appears in the above-identified patent and that said Letters Patent is hereby corrected as shown below:

Column 8, line 26, change "11" to -- 9 -- and line 59, change "16" to -- 14 --.

Signed and Sealed this

Twenty-first Day of April, 1987

Attest:

DONALD J. QUIGG

Attesting Officer

Commissioner of Patents and Trademarks